(12) United States Patent
Burton (10) Patent No.: US 6,267,111 B1
(45) Date of Patent: Jul. 31, 2001

(54) PORTABLE SELF-CONTAINED MOBILE VENDING UNIT

(76) Inventor: William Hendricks Burton, 1532 Sunset Rd., Castleton, NY (US) 12033

( * ) Notice: Subject to any disclaimer, the term of this patent is extended or adjusted under 35 U.S.C. 154(b) by 0 days.

(21) Appl. No.: 09/236,780

(22) Filed: Jan. 25, 1999

(51) Int. Cl.[7] .................................................. B60P 3/025
(52) U.S. Cl. ............................. 126/268; 108/25; 108/65; 108/156; 108/167; 296/22
(58) Field of Search .............................. 126/33, 43, 261, 126/268, 276; 99/483, 449; 108/42, 25, 26, 64, 65, 167, 170, 171, 175, 156, 157.1, 158, 189, 134, 178; 312/140.4, 351.13; 248/188.4, 188.8; 296/22

(56) References Cited

U.S. PATENT DOCUMENTS

| | | | |
|---|---|---|---|
| 1,464,889 | * | 8/1923 | Stirn .................................... 126/33 |
| 3,261,307 | * | 7/1966 | Salkoff .................................. 108/64 |
| 3,683,791 | * | 8/1972 | Rast, Jr. ............................ 126/25 R |
| 4,665,888 | * | 5/1987 | Christen, Jr. et al. ........... 126/25 R |
| 4,739,580 | * | 4/1988 | Simmons et al. .................... 126/261 |
| 4,919,109 | * | 4/1990 | Riley .................................... 108/65 |

FOREIGN PATENT DOCUMENTS

JP-10117849-A * 5/1998 (JP).

* cited by examiner

*Primary Examiner*—Sara Clarke
(74) *Attorney, Agent, or Firm*—Hoffman, Warnick & D'Alessandro LLC; Michael F. Hoffman (57) ABSTRACT

My invention, the "Portable Self-Contained Mobile Vending Unit," revolutionizes the single chafing dish equipment used by caterers as well as the small steam table used by food vendors in a mobile vending "hot cart." Caterers as well as mobile food vendors can offer their customers a complete professional looking buffet style set-up of foods, indoor or outdoor, with a minimal amount of set-up. Another benefit is that the equipment is lightweight as well as durable, and requires no maintenance. The expansion of the standard style mobile vending "hot cart" from one or two full chafing dish compartments to as many as seven additional full size portable steam pans, offers a food operator endless potential. Additionally, the self-contained style saves the food caterer from setting up a separate table to accommodate his separate chafing dishes. The unit can be easily attached to mobile vending units, also known as "hot carts," or easily detached and used independently adding a new dimension of simplicity to the food warming/serving process.

19 Claims, 12 Drawing Sheets

PORTABLE SELF-CONTAINED MOBILE VENDING UNIT

BACKGROUND OF THE INVENTION

1. Field of the Invention

This invention relates generally to a food warming device, and more specifically, for commercial use by food service businesses such as caterers and outdoor food vendors.

2. Description of the Related Art

The operator of a food business faces many challenges, one of which is the serving of food to customers at the proper temperature as required by each and every state's Health Department. The equipment choices for accomplishing this task are extremely limited. The outdoor food vendor has the choice of a "hot cart" type apparatus or a vending truck. There is no affordable and mid-sized equipment available that allows the food operator or caterer to expand from a simple small vending "hot cart" before purchasing a vending truck. Additionally, this equipment is more certainly not designed for versatile year round use, as weather and climate are most likely outdoor factors.

The alternative food warming apparatus contains one or more food units and yet is self-contained (versus a single pan warmer unit). The alternative invention is also easily portable, much more affordable than a vending truck, versatile for indoor and outdoor use, and allows the food operator to serve more customers with more variety in a buffet style set-up than does a vending "hot cart" (if so desired, as it is also an extension which can be easily detached or attached).

BRIEF SUMMARY OF THE INVENTION

The present invention provides an easily attachable "portable-mobile vending stainless table unit" which is also designed to meet both state and county health codes anywhere in the United States. Additionally, the invention is adaptable to most any small vending "hot cart" for transporting purposes if so desired.

According to yet another aspect of the invention, the unit is easily detachable and suitable for both indoor and outdoor use. The portable stainless table unit can be transported in and of itself on a trailer or in a van or box truck. The dimensions and lightweight design of the invention give the owner/operator versatility in transporting as well as functional use.

According to another aspect of the invention, the durability of the portable mobile vending stainless table unit as it relates to transportable mileage is very sound and durable. Over a 6 month period, the modified Gate and T-Hinge attachment to my mobile vending unit exceeded 3,500 miles and showed no signs of wear, tear or damage. Reference to Drawing 2 of 18, which includes exploded view of modified Gate and T-Hinge. Furthermore, the invention has a high rating of durability as it relates to the set-up and tear-down of the unit. I found that over a 6 month period, 5 days per week, with an average operation of 4 hours per day, the invention shows no signs of wear, tear or damage.

According to another aspect of the invention, the unit is enhanced by its design which is easy to clean and maintain. Additionally, the individual holding compartments for the water, to be used as part of the heating element, are more favorable to the operator than one large compartment to hold and dispense the water.

This invention enabled me to serve food in an efficient and desirable manner to my customers at public and private events both indoor and outdoor.

These above mentioned and other objects, advantages and features of this invention will be further identified in the drawings and description of the drawings.

BRIEF DESCRIPTION OF THE DRAWINGS

FIG. 1 shows a folded and secured independent view of the invention. Also three enlarged sectional views which include a: FIG. 1A—fabricated liner, FIG. 1B—3" hinge connection, and FIG. 1C ¼" wing nut locking bolt.

FIG. 2 shows invention unfolded with leg assembly and hinge assembly attachment to vending cart. Also exploded internal view (FIG. 2A) of hinge screw assembly as attached to invention and vending cart.

FIG. 4 shows L-shaped assembled view of invention attached to vending cart. Also enlarged view (FIG. 4A) of modified hinge to hitch pin connection for 3" hinge and leg assembly.

DETAILED DESCRIPTION OF THE INVENTION

Figures 2, 2A:
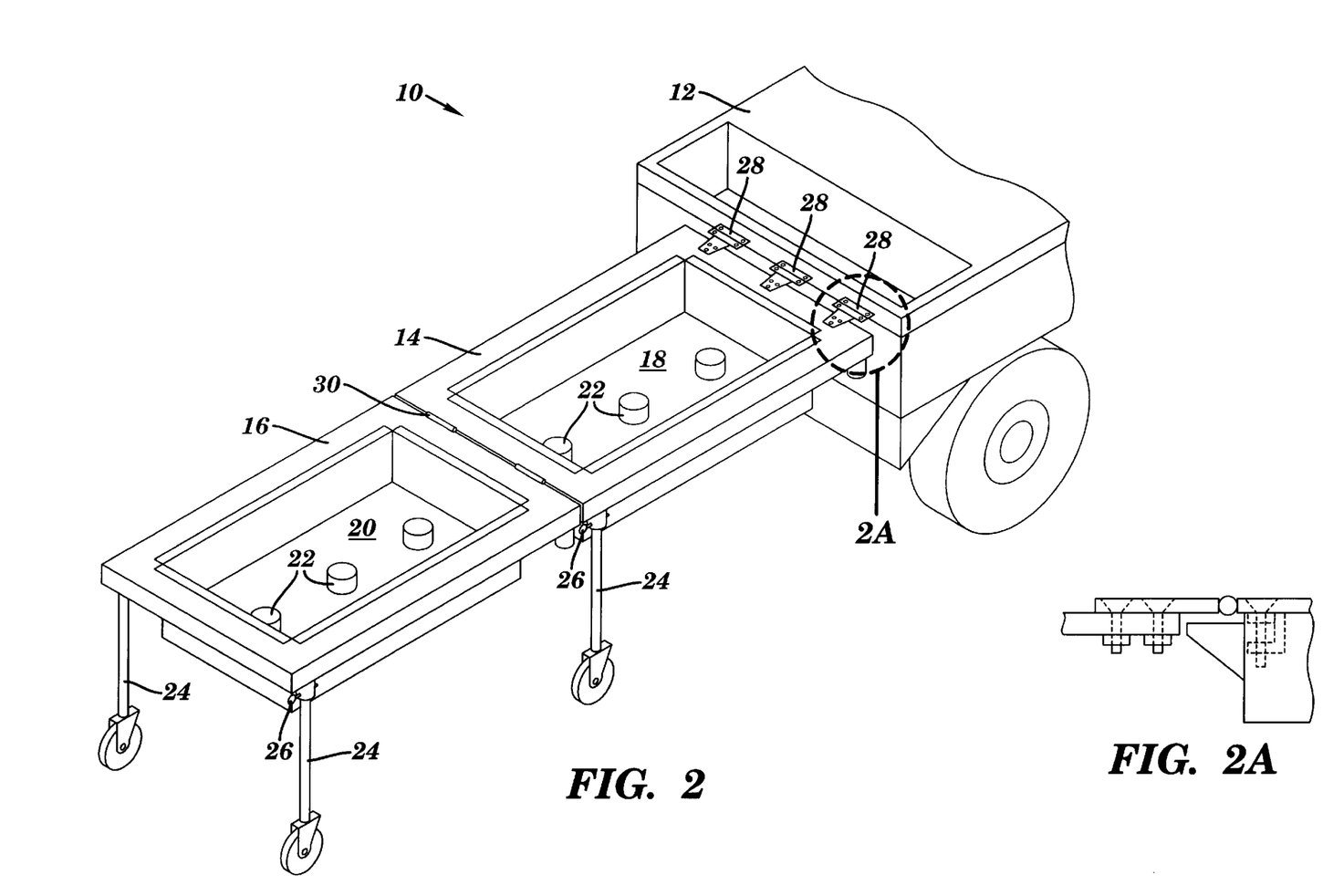
Figure 3:
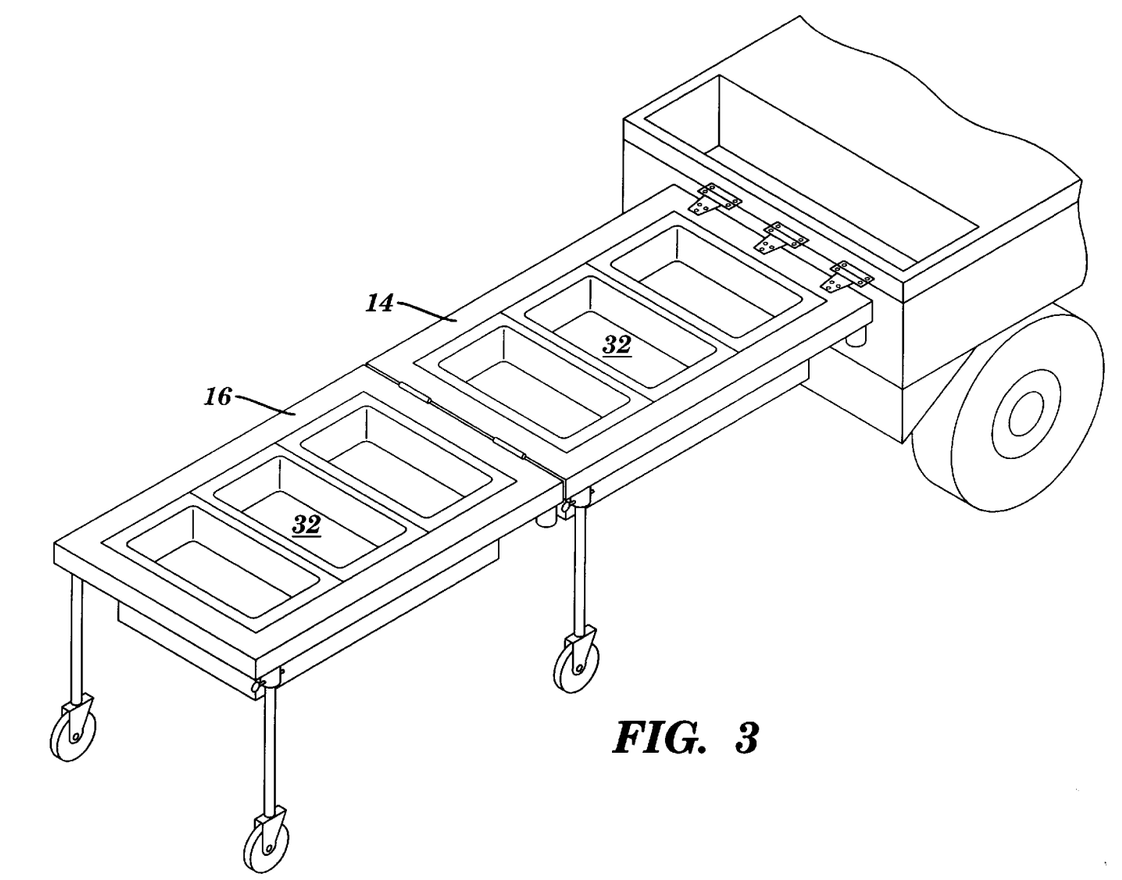
FIG. 3 shows same assembly view as 2 only opposite side.
Figure 6:
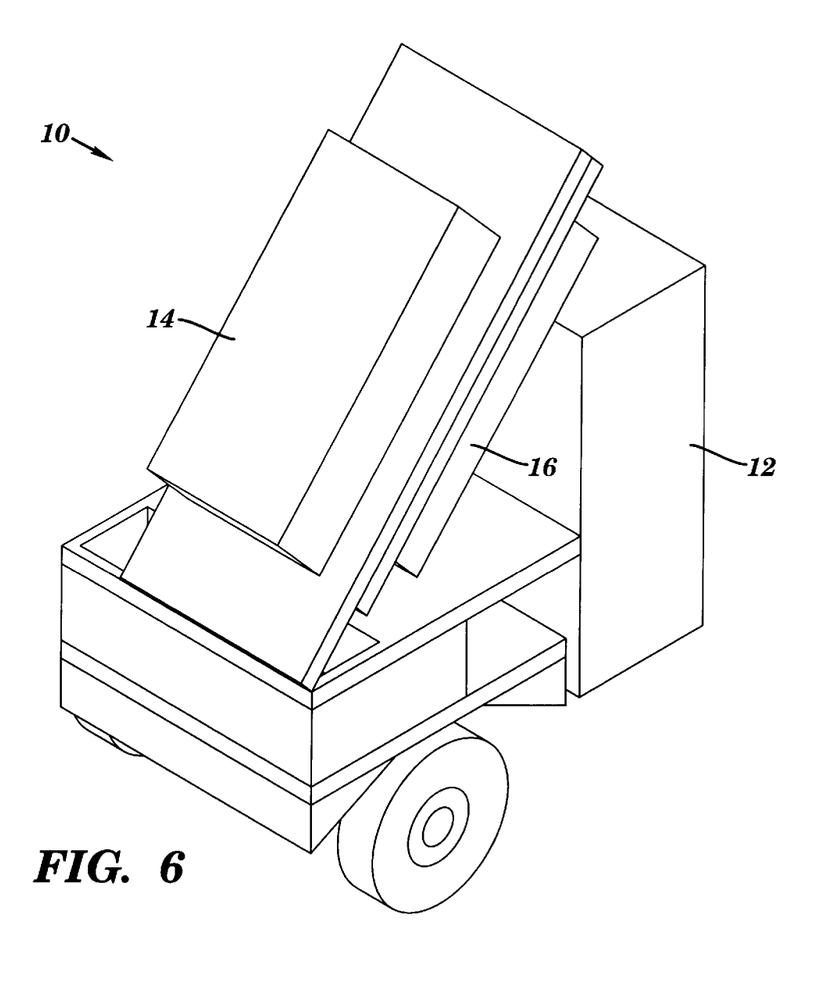
FIG. 6 shows a straight assembly view of invention in folded and secured position on vending cart ready for transporting.
Figure 8:
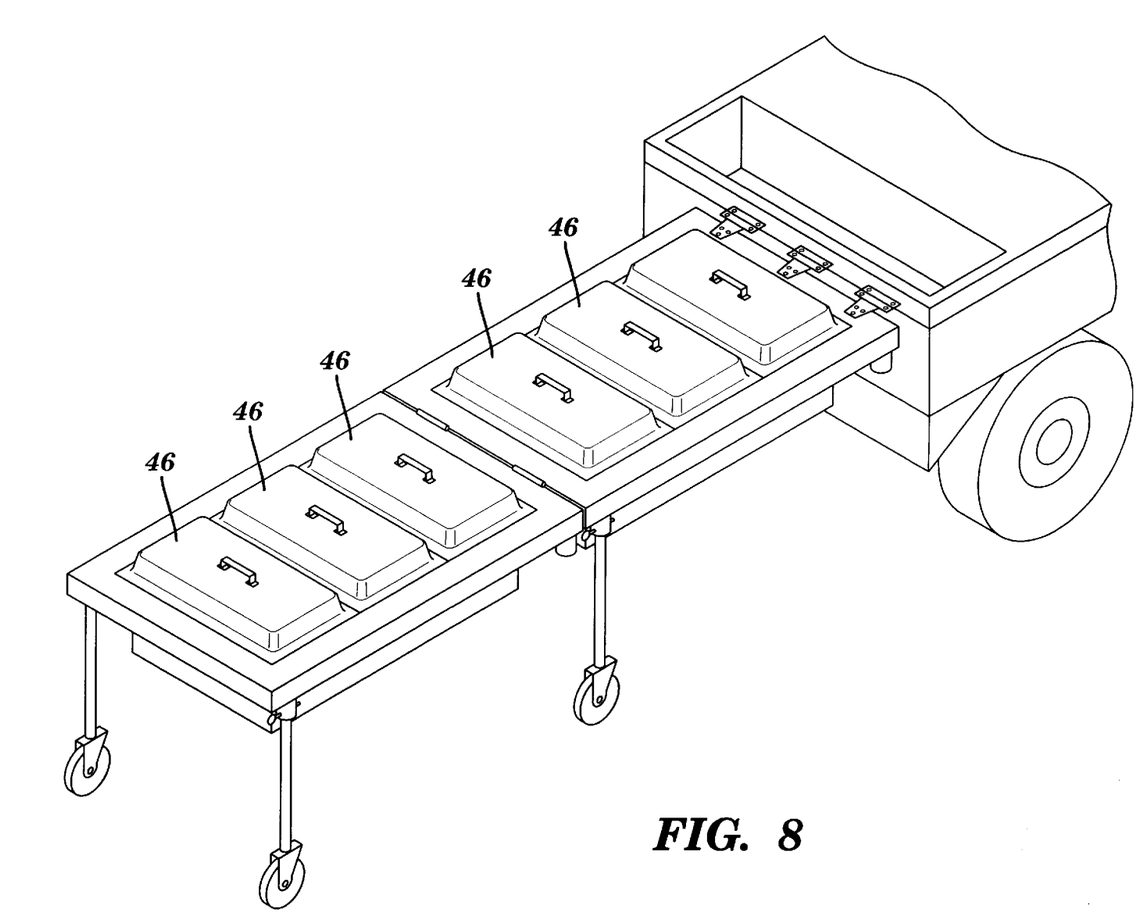
FIG. 8 is same as view of FIG. 3, with addition of steam covers.
Figure 9:
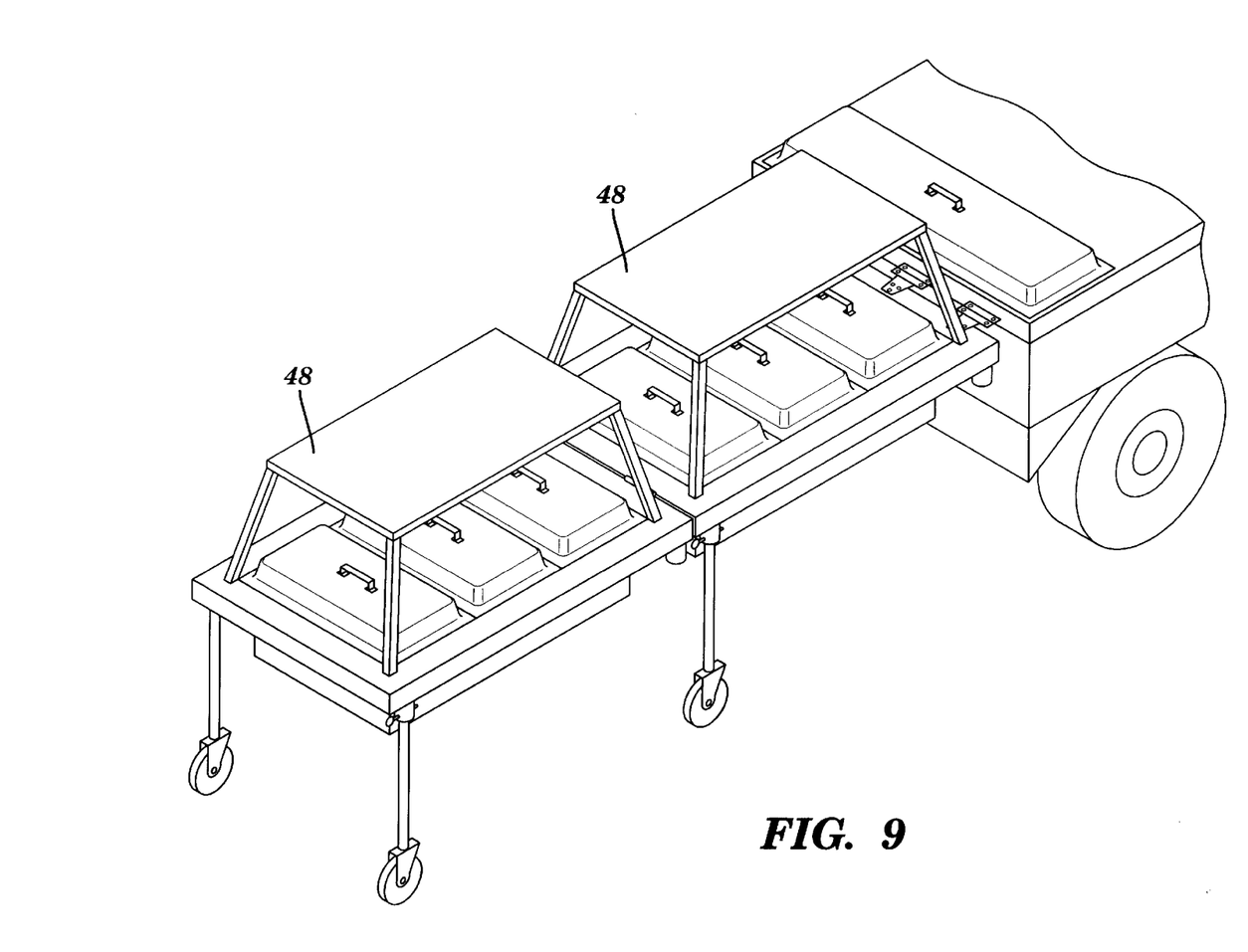
FIG. 9 shows completed attached assembly with mandatory sneeze guards (as required by New York State Health Department). Also shows customer's viewing side.

Referring first to FIG. 2, a first embodiment of a portable mobile vending unit 10 is shown attached to a cart 12 with hinges 28. Unit 10 comprises a first table 14 and a second table 16 attached to each other with hinges 30. The two tables 14 and 16 are supported by removable legs 24, which can be removed by release pins 26. Each table is equipped with a boot liner 18 and 20, and fitted with warming mechanism 22 (e.g., STERNO™ warmers). FIG. 3 depicts each of the tables further fitted with water pans 32. FIG. 8 depicts tables 14 and 16 with covers 46. FIG. 9 depicts the tables 14 and 16 each further comprising a sneeze guard 48. The two tables 14 and 16 can be collapsed onto cart 12 by removing legs 24 and folding second table 16 onto first table 14, and then folding the two tables up onto the cart 12. FIG. 6 depicts tables 14 and 16 folded onto cart 12.

Figures 4, 4A:
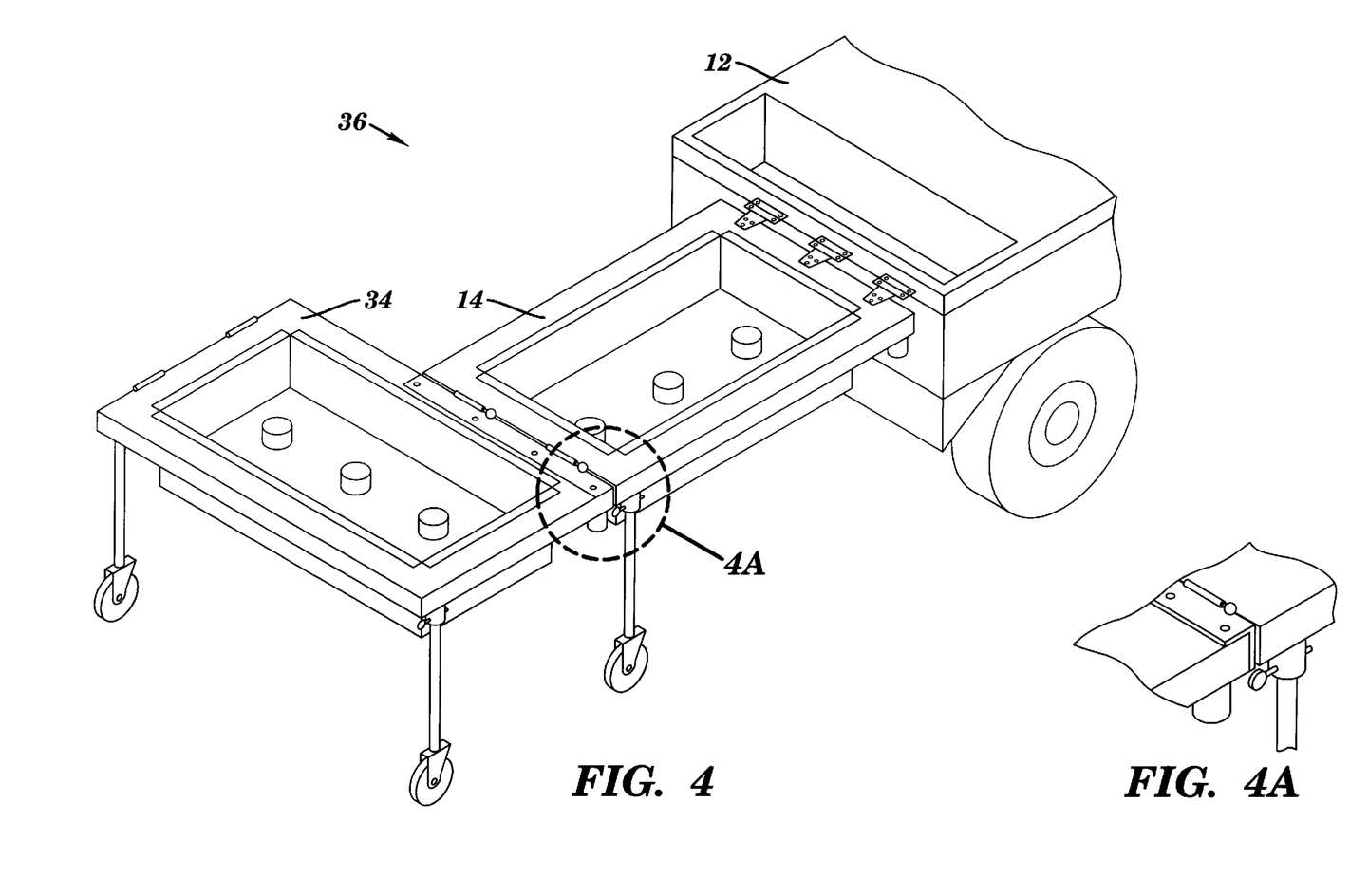
Figure 10:
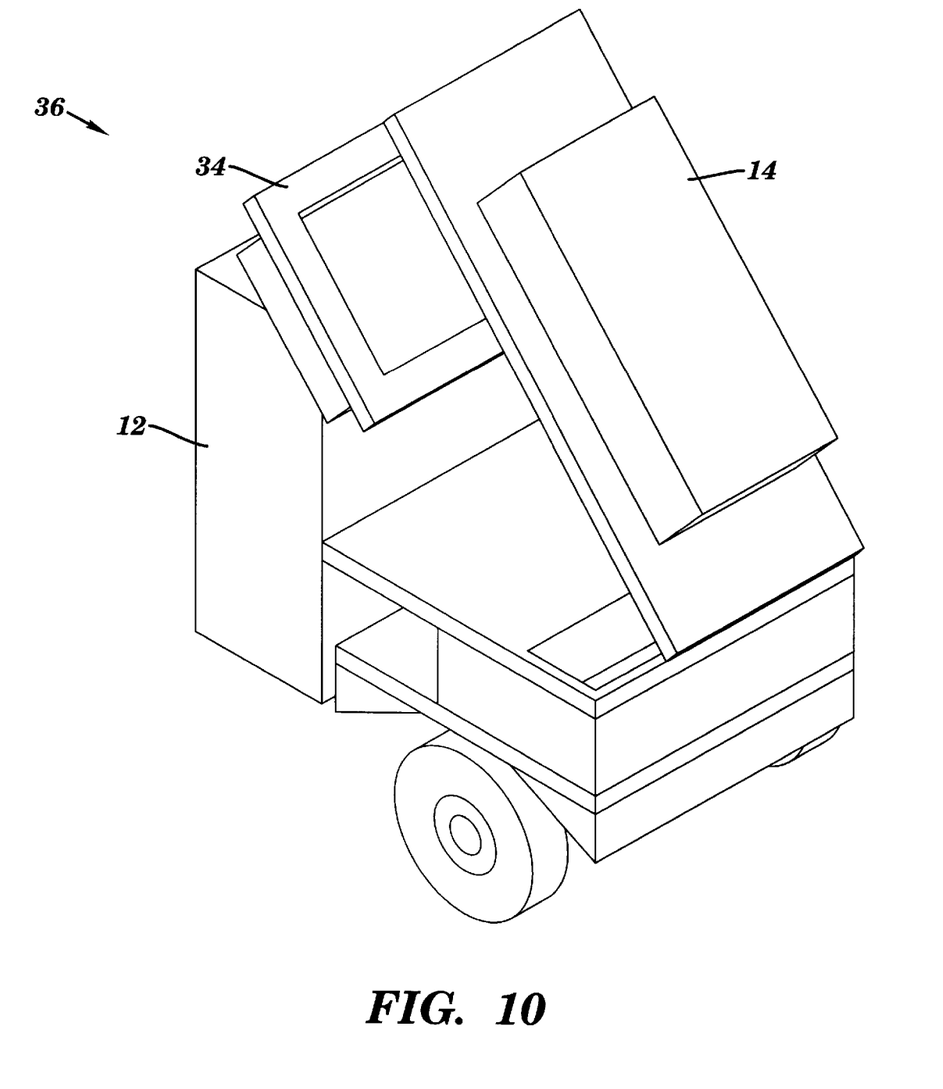
FIG. 10 displays "L"-shaped assembly view of invention in folded, secured and transportable position as attached to vending cart.
Figure 11:
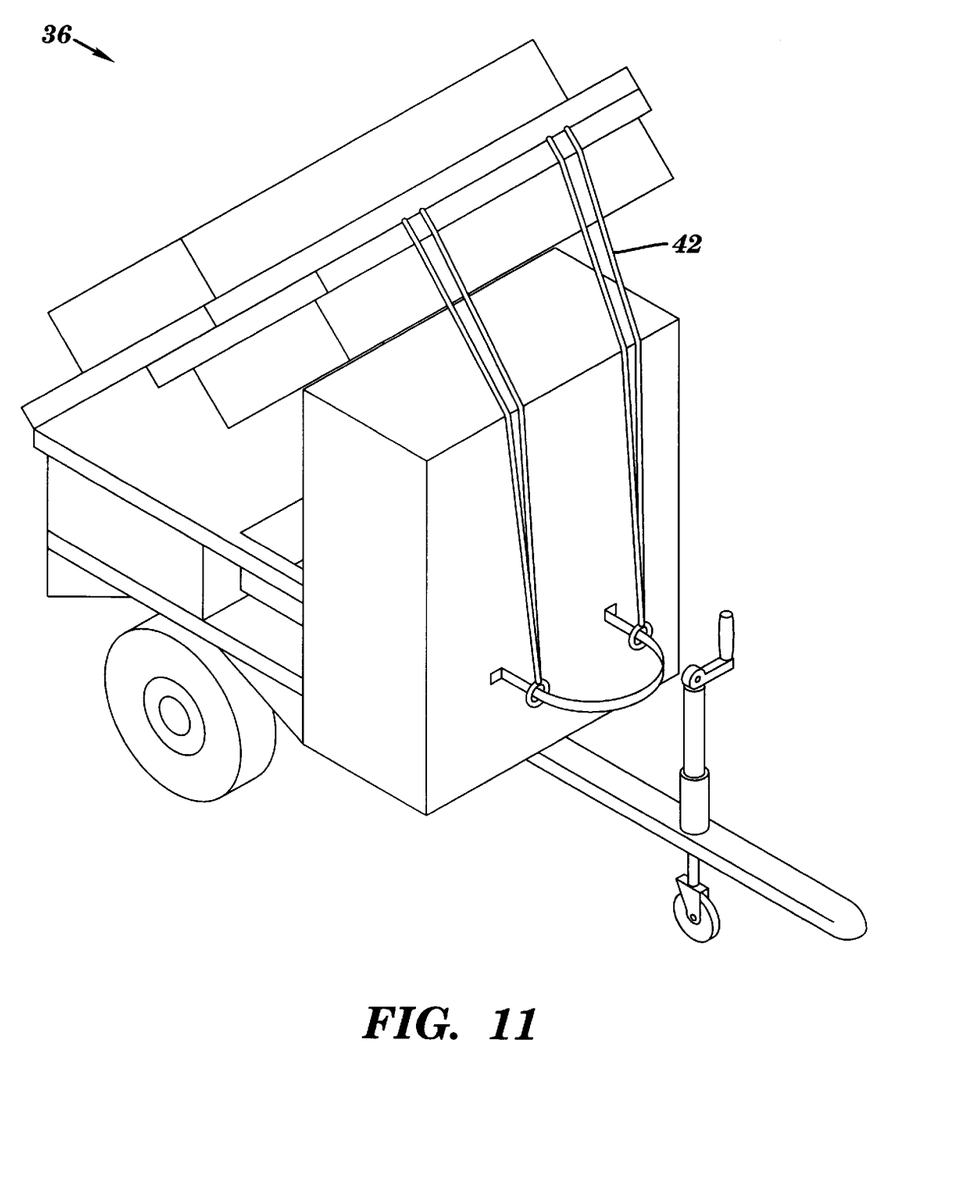
FIG. 11 is same as FIG. 13, only opposite side view which displays 4 each 48" bungee cord tie downs securing invention unit to cart.
Figure 12:
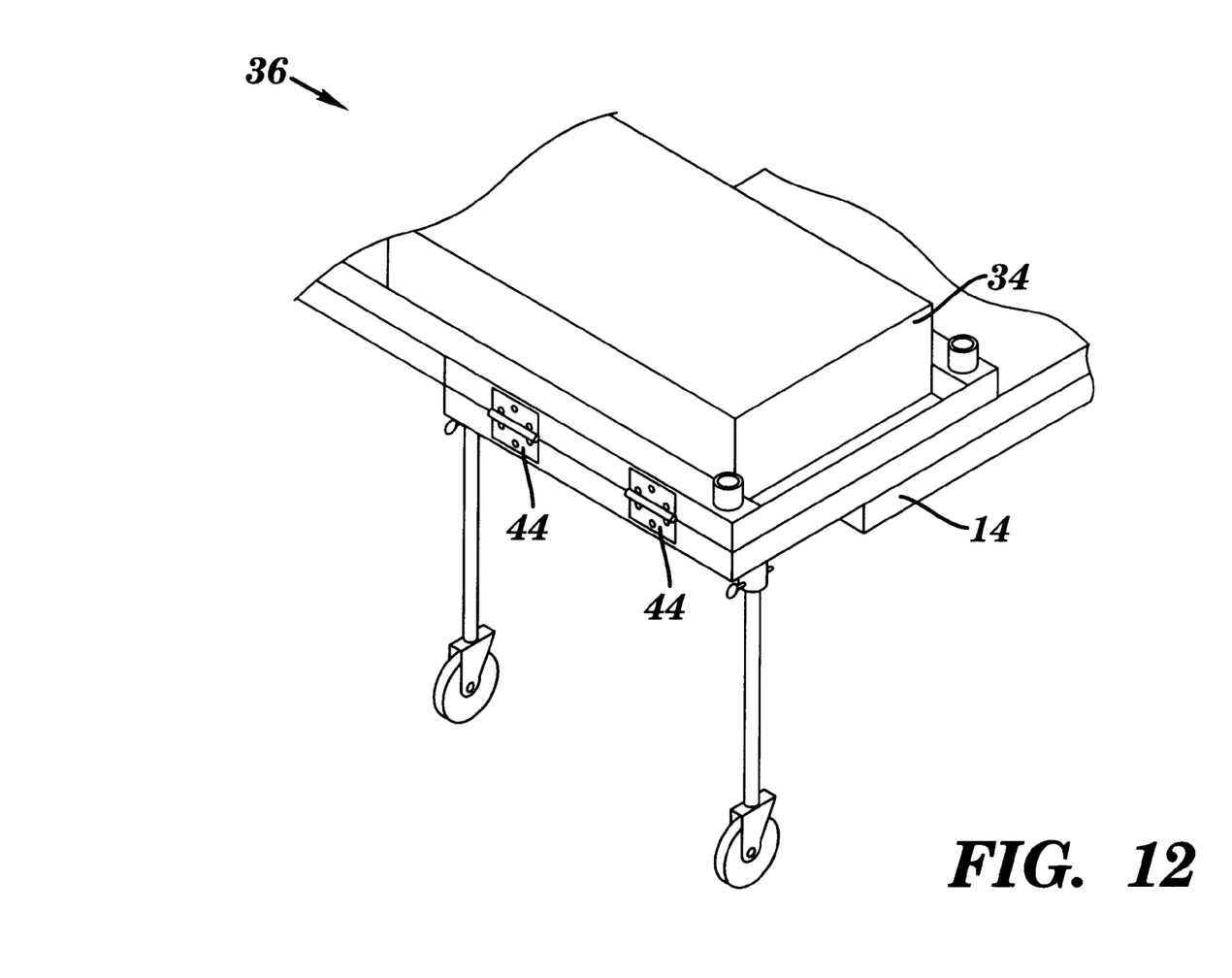
FIG. 12 shows 3" brass coated steel hinge assembly forming attachment of L-shaped invention (in first stage of set-up).

FIG. 4 depicts a second configuration 36, wherein the second table 34 is mounted transversely to first table 14. FIG. 10 depicts the second configuration 36 having first table 14 and second table 34 collapsed onto cart 12. FIG. 11 depicts the rear view of second configuration 36 as shown FIG. 10. Also shown are securing straps 42. FIG. 12 shows the second configuration 36 with table 34 folded onto table 14. This configuration utilizes a pair of hinges 44 to effectuate the fold.

Figure 5:
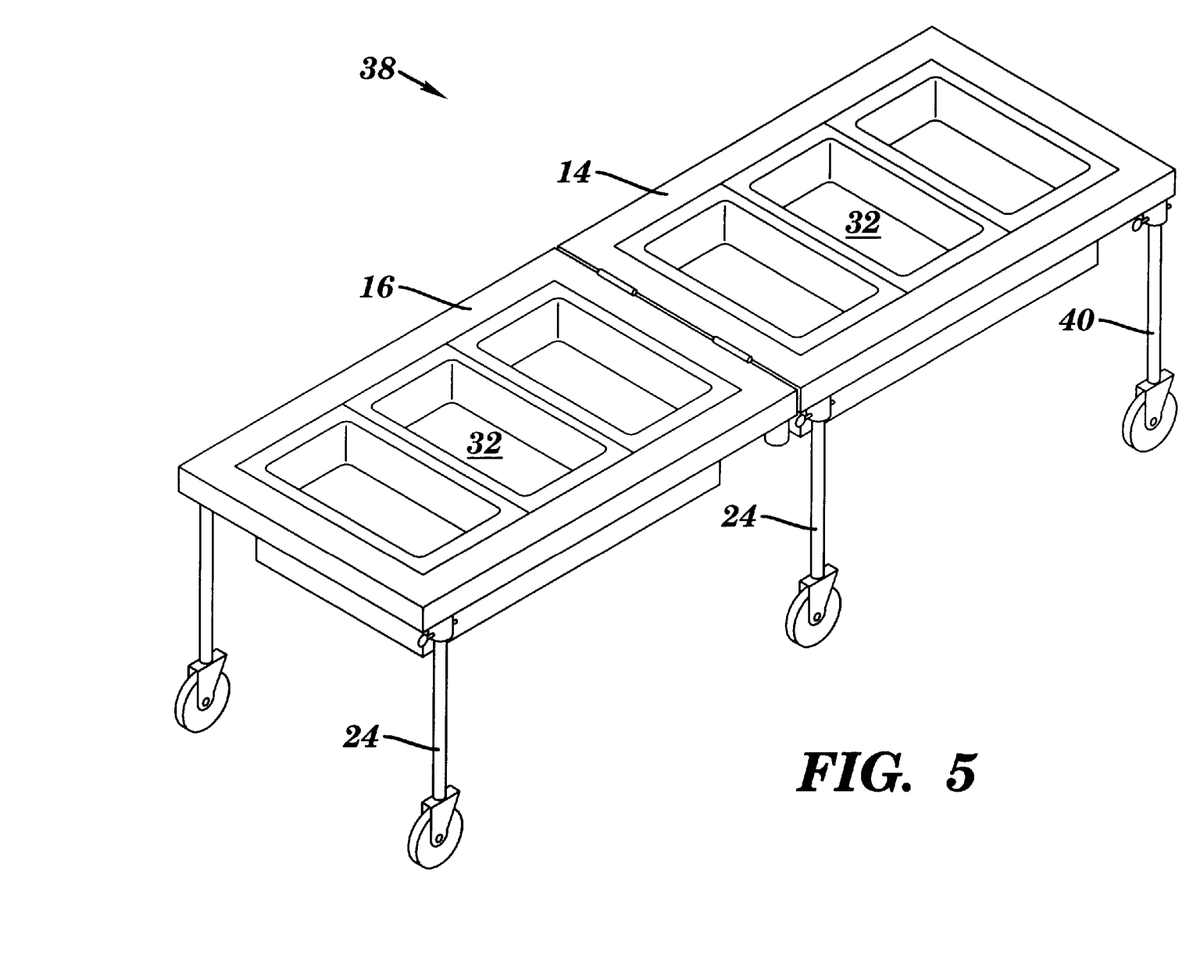
FIG. 5 shows independent view of assembled invention with steam jackets inserted.

FIG. 5 depicts the first table 14 and second table 16 in a free standing mode with a third set of legs 40 supporting the tables.

Figures 1, 1B, 1C:
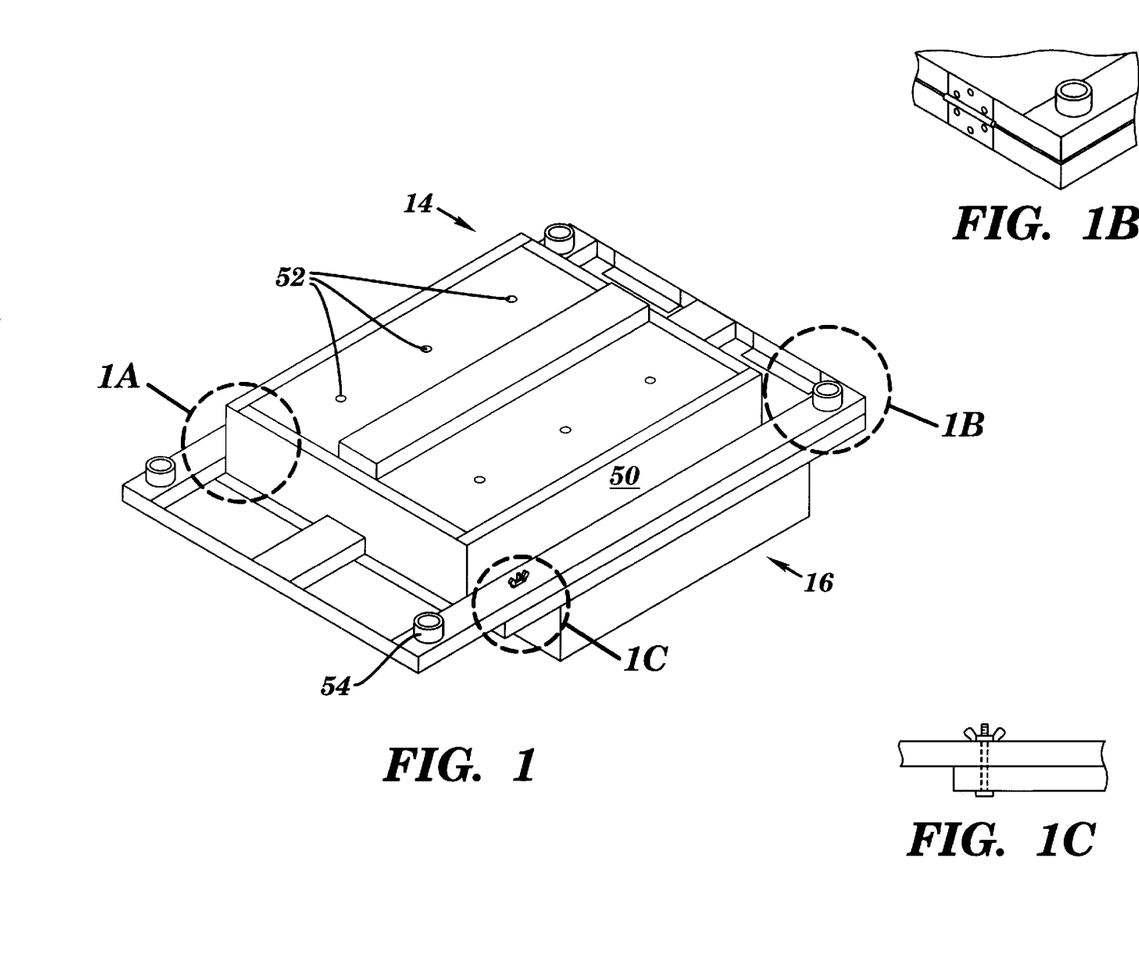

The attached "Portable Mobile Vending Unit/Units" can be made from 2' to 6' stainless steel flat top work tables as shown in FIG. 1. The size of the tables can vary depending on the food operator's needs.

First Step: Measure, lay out and cut a rectangular hole in the top of Spec NSF 14 GA 304 stainless steel work table to accompany stainless steel boot liner and dripless chafer water pans (one to four pans can be used). For example, rough cut opening are as follows:

1 pan=12¾"×20¼" opening
2 pan=26¾"×20¼" opening
3 pan=41"×20¼" opening
4 pan=55¼"×20¼" opening Use a steel cutting abrasive blade for cutting and debur by filing all sharp edges.

Figure 1A:
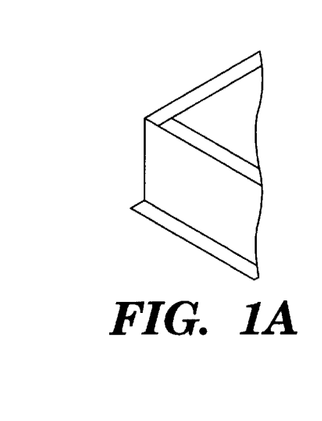

Second Step: Size the 20 gauge T-304-2B stainless steel double lip boot liner illustration FIG. 1——exploded view A—to fit the table top opening by cutting the 1" lips at desired measurement with steel cutting abrasive saw blade. Bend stainless steel boot liner 50 to 90 degree angle and insert into table opening with 1" lip facing out on table top. File all sharp edges.

Third Step: Hold Boot liner 50 tightly against inner cut edge of table top and drill series of laid out holes 52 for 3/16" pop rivets through lip and table top. Install rivets leaving opening in front to access sterno cups.

Fourth Step: Debur and file remaining stainless steel table top cut out piece. Set piece inside riveted boot liner. Lower to bottom of 1" lip. Lay out rivet hole pattern and drill through holes. Fasten with 3/16" pop rivets forming the completion of the chafer boot holder.

Fifth Step: Match top of table unit in step 4 to height of mobile vending "hot cart" unit. Measure, cut off and debur bottom or bullet end of only two table legs for each table unit. Note: Allow distance for 4" to 5" caster wheel unit with 1½" expander stem to be inserted into bottom of leg. Insert modified table leg with assembled caster wheel unit into female receiving sleeve on bottom side of table. Measure and drill ⅜" diameter through hold approximately ½" down from the edge of the table leg receiving sleeve. File and debur. Insert ⅜" by 3" hitch pin as in illustration 4. Note: When independent table units are used without mobile vending unit attached, two additional modified leg units with wheel locks are needed as in FIG. 5.

Sixth Step: Butt modified table top unit from step five against mobile vending cart 12 (as illustrated in FIG. 2). Use two heavy duty 5" galvanized gate hinges for single table and two heavy duty 5" galvanized gate hinges, plus one heavy duty 4" galvanized Tee-hinge for double folding table unit. Lay out hinge locations with taper tongue end of hinge on table and wider (4" to 5") end of hinge on mobile vending cart tubular framework. Lay out tongue hold locations on table end top, and drill 5/16" through holes. Insert ¼"×20" by 1½" long threaded bolts through hinge tongue and table top. Fasten with wide heavy duty washers and ¼" lock nuts to underside (snug nuts tight). Lay out the four hinge hole locations, centering on the ¾" tubular framework of the mobile vending cart. Center drill hole locations, and drill ⅛" through hole. Enlarge holes by using number 7 tap drill. Carefully tap (with aid of tap fluid) and ¼"—20 tap through both sides of ¾" tubular frame. Insert ¼"×20"×1¼" machine flathead screws and tighten firmly as illustrated in FIG. 2 showing the exploded view. This modified attached table unit will be designated the first table unit. The next attached table unit will be designated the second table unit.

Seventh Step: When attaching a second serving table unit, use two standard steel 3" plated brass removable pin hinges 30, as illustrated in FIG. 1—exploded view B. At this point, hinge chamfered screw holes which need to be rechamfered to ⅜" wide to receive ¼"×20" by ¾" flathead screws appropriately in the straight table and L assemblies.

Figure 7:
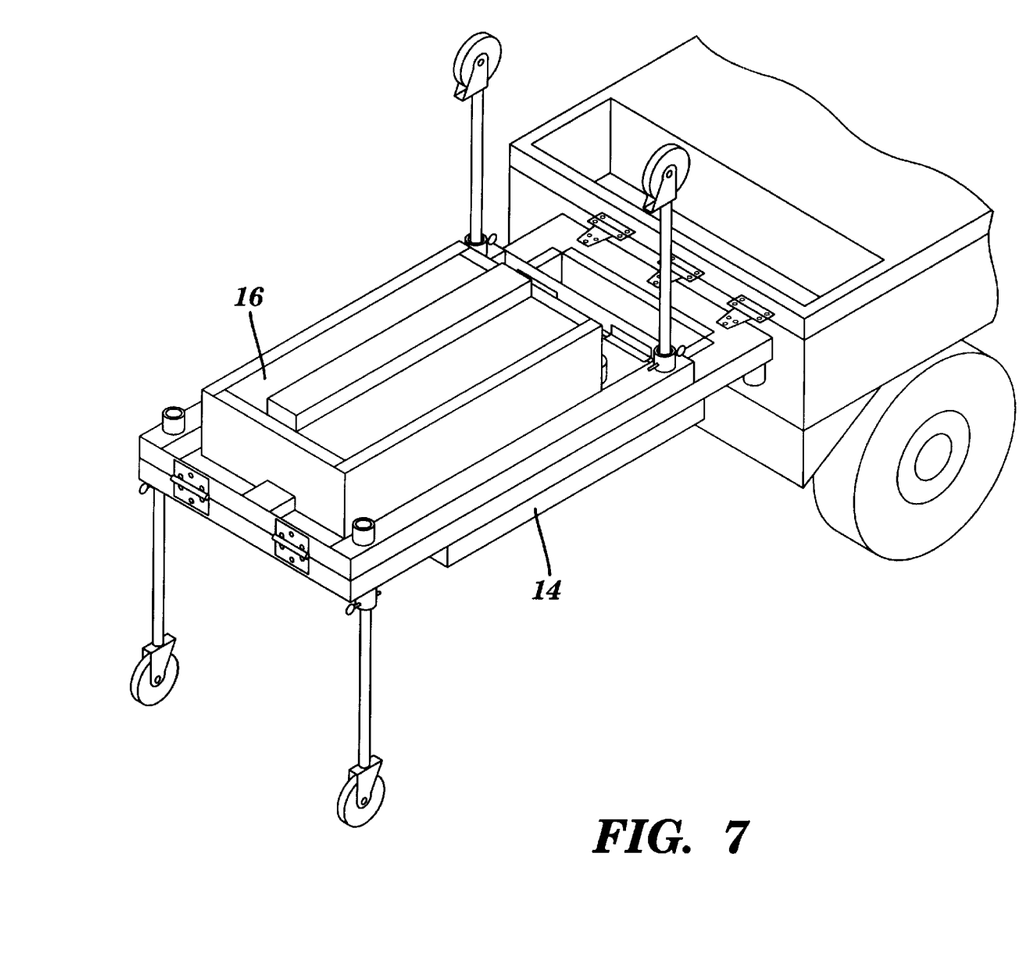
FIG. 7 shows first stage of unfolded invention with leg assembly as attached to vending cart.

Align second unit (preferably at least one foot shorter in length than first serving table unit) upside down on top of first table unit, as illustrated in FIG. 7. Space hinges 6" in from each side of first table end. Mount with hinge pin above table surface. Support lip ends of tables with 10" long by 1" side by ⅛" thick aluminum plates against backside of lips. Use small "C" clamp to aid in holding aluminum plate and hinge in place on table lips, while drilling 5/16" through holes. Fasten this assembly with ¼"×20" by ¾" long flathead machine screws, lockwashers, and ¼"×20" nuts. Tighten firmly.

Next, drill 5/16" clearance hole completely through both folded tables as illustrated in FIG. 1—exploded view "C" at 12½" to 12¾" in from end of table. Center hole location in the middle of the underside support table beam. Install ¼"×20"×3¾" long hex bolt and hand tighten wing nut firmly.

For "L" shape table assembly of second table, place 1½"×1/16"×30" aluminum angle along left side of table. Be sure to butt aluminum angle to table end. Hold tightly in place and lay out five pop rivet locations. Drill 3/16" through holes, and install 3/16" pop rivets. Refer to FIG. 5 of 18 for this aluminum angle location. Remove hinge pins from both hinge locations and separate table units. Place second table unit upside down on first table top unit in 90 degree angle alignment position to the first table, with riveted 1½" aluminum angle at edge as in FIG. 12. Disassemble second set of 3" plated hinges by removing hinge pins. Mate loose halves of hinge plates to already mounted hinge halves of first table unit, and reinstall hinge pins. Open assembled hinge plate against aluminum angle of second table. Using these hinge plates as templates, drill 5/16" holes through aluminum angle and edge of table. Fasten with ¼×20"×¾" flathead machine screws, lockwasher and ¼"×20" nut. Tighten firmly. Also refer to FIG. 12 completed hinge assembly. Note: For quick change of straight assembly table units as shown in FIG. 2 to "L" shape table units as shown in FIG. 4, substitute ¼"×3½" hitch pins for standard ¼" hinge pins.

Eighth Step: In the bottom of the chafing boot holder centering the layout of the first and last set of sterno fuel cup holders, measure approximately 5½" in from the front and side walls of the chafing boot liner. Lay out location for third and fourth set of steam fuel cup holders by centering under third and fourth dripless chafer water pans. Holding sterno fuel cups in place, drill 3/16" through hole and insert pop rivet fasteners to bottom of chafing boot holder, as shown in FIG. 8.

Ninth Step: Installation of sterno shield. Refer to FIG. 2. The shield material to be the same stainless material as used for the boot liner. Dimensions to be as follows: Length to be the same as the opening in the boot liner. Height to be 6" with a 1" 90 degree angle lip for mounting on the table top, fastened by 3/16" pop rivets at five separate, laid out locations. Four inches down from table top, sterno shield should be bent at a 45 degree angle which will leave a 2" outward flare. Note: Be sure all sharp edges of sterno shield are filed and sanded smooth.

What is claimed is:

1. A food warming device, comprising:
   a plurality of hinged-together, flat top tables;
   a plurality of table legs attachable to the tables, the legs having wheels; and
   a boot liner compartment in each of the tables for holding a steam jacket and a canned liquid fluid unit;
   wherein the warming device is usable for displaying and warming prepared foods.

2. The food warming device of claim 1, wherein the wheels are caster wheels and further including wheels locks for the wheels.

3. The food warming device of claim 1, wherein there are seven of said hinged-together tables.

4. The food warming device of claim 1, further comprising hitch pin hinges for hinging the tables together, and the tables fold out into a straight or L-shaped configuration.

5. The food warming device of claim 1, wherein the tables fold out into a C-shaped configuration.

6. The food warming device of claim 1, wherein the tables boot liners are made of stainless steel.

7. The food warming device of claim 1, wherein said warming device is attachable to a vending cart using hinges.

8. The food warming device of claim 7, wherein the hinges for attaching the warming device to the vending cart are gate and Tee hinges.

9. A food vending device, comprising:
   a mobile vending unit;
   a plurality of hinged-together, flat top tables, one of said tables being connected to the vending unit;
   a plurality of table legs attachable to the tables, the legs having wheels; and
   a boot liner compartment in each of the tables for holding a steam jacket and a canned liquid fuel unit;
   wherein the tables are usable for displaying and warming prepared foods.

10. A food vending table attachable to a mobile vending unit, comprising:
    a hinge located on a first end of the table for attachment to the mobile vending unit, wherein said hinge allows the table to be folded towards the mobile vending unit; and
    at least one leg positioned proximate a second end of table for providing support to the second end of the table;
    wherein the table includes a boot liner compartment for holding a steam jacket.

11. The food vending table of claim 10, wherein the hinge provides support for the first end of table.

12. The food vending table of claim 10, wherein the at least one leg is releasably attachable to the table.

13. The food vending table of claim 10, wherein the at least one leg includes a wheel.

14. The food vending table of claim 10, further comprising a second table, wherein the second table includes a first end that is hinged to the second end of the first table with a second hinge.

15. The food vending table of claim 14, wherein the second table can be folded onto the first table.

16. The food vending table of claim 14, wherein the second table includes at least one leg at a second end of the second table for supporting the second end of the second table.

17. The food vending table of claim 14, wherein the first end of the second table is supported by the second hinge.

18. The food vending table of claim 14, wherein the second end is attached to form a straight configuration.

19. The food vending table of claim 14, wherein the second end is attached to form an L-shaped configuration.

* * * * *